US012561384B2

(12) United States Patent
Savir et al.

(10) Patent No.: US 12,561,384 B2
(45) Date of Patent: *Feb. 24, 2026

(54) SEARCH AND RECOMMENDATION ENGINE ALLOWING RECOMMENDATION-AWARE PLACEMENT OF DATA ASSETS TO MINIMIZE MAXIMAL LOAD

(71) Applicant: Dell Products L.P., Round Rock, TX (US)

(72) Inventors: Amihai Savir, Newton, MA (US); Ofir Ezrielev, Be'er Sheva (IL); Oshry Ben Harush, Cedar Park, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 553 days.

This patent is subject to a terminal disclaimer.

(21) Appl. No.: 17/875,750

(22) Filed: Jul. 28, 2022

(65) Prior Publication Data

US 2022/0365995 A1 Nov. 17, 2022

Related U.S. Application Data

(63) Continuation-in-part of application No. 17/871,843, filed on Jul. 22, 2022, now Pat. No. 12,346,340, (Continued)

(51) Int. Cl.
*G06F 17/00* (2019.01)
*G06F 16/9535* (2019.01)
(52) U.S. Cl.
CPC .................................. *G06F 16/9535* (2019.01)
(58) Field of Classification Search
CPC .. G06F 16/256; G06F 16/285; G06F 11/3457; G06F 11/3438; G06F 17/40; G06F 16/9535
See application file for complete search history.

(56) References Cited

U.S. PATENT DOCUMENTS 8,615,589 B1 * 12/2013 Adogla ................. G06F 9/5077
709/226
8,688,625 B1 * 4/2014 Clark ..................... G06Q 10/00
707/602

(Continued)

OTHER PUBLICATIONS

Jay Patel et al., Task Execution Efficiency Enrichment in Cloud Based Load Balancing Approaches. In Proceedings of the 2014 Inter Conference on Information and Communication Technology for Competitive Strategies. Asso. for Computing Machinery,64, 1-5,<https://doi.org/10.1145/2677855.2677919>, Sep (Year: 2014).*

*Primary Examiner* — Greta L Robinson

(74) *Attorney, Agent, or Firm* — Staniford Tomita LLP

(57) ABSTRACT

A search engine responding to a user query to find relevant data assets in a federation business data lake (FBDL) system based on interactions of known users interacting with data assets in the FBDL system. Data assets are optimally placed for minimal latency or maximal load. Data asset recommendations and past data asset access information are input as features to a time-series model for predicting future data access patterns. An expected latency and load risk is then determined and scored by a weighted mean of these values, and placement optimization is simulated using an optimization method (e.g., genetic algorithm). Using the scoring and simulation, a data asset placement engine is then used to move the locations of the data assets to minimize maximal load that comprises a load risk representing how close a current load is to a service level agreement (SLA) requirement set by a system provider.

17 Claims, 10 Drawing Sheets

Related U.S. Application Data which is a continuation-in-part of application No. 17/711,839, filed on Apr. 1, 2022, now Pat. No. 12,141,158, which is a continuation-in-part of application No. 15/084,324, filed on Mar. 29, 2016, now abandoned.

(56) References Cited

U.S. PATENT DOCUMENTS

| | | | | |
|---|---|---|---|---|
| 8,738,325 | B2 * | 5/2014 | Cloutier | G06Q 10/10 |
| | | | | 702/182 |
| 10,594,740 | B2 * | 3/2020 | Barday | G06F 21/6245 |
| 10,795,895 | B1 * | 10/2020 | Taig | G06F 16/24578 |
| 2012/0060167 | A1 * | 3/2012 | Salsburg | G06F 9/50 |
| | | | | 703/21 |
| 2016/0182399 | A1 * | 6/2016 | Zadka | H04L 47/726 |
| | | | | 709/226 |
| 2019/0079940 | A1 * | 3/2019 | Krishnan | G06F 16/119 |
| 2022/0374329 | A1 * | 11/2022 | Savir | G06F 11/3457 |

* cited by examiner

USERS INTERACT WITH DATA ASSETS IN THE
FBDL SYSTEM
402

MONITORING SERVICE RECORDS
INTERACTIONS AND FEEDS RECOMMENDATION
ENGINE
404

RECOMMENDATION ENGINE CALCULATES
RELEVANCE OF INFO TO EACH USER AND
SUGGESTS NEW DATA ASSETS
406

700

|  | DA-1 | DA-2 | DA-3 | DA-5 |
|---|---|---|---|---|
| User A | 0 | 0 | 1 | 0 |
| User B | 1 | 1 | 0 | 1 |
| User C | 0 | 1 | 0 | 0 |
| User D | 0 | 0 | 0 | 1 |

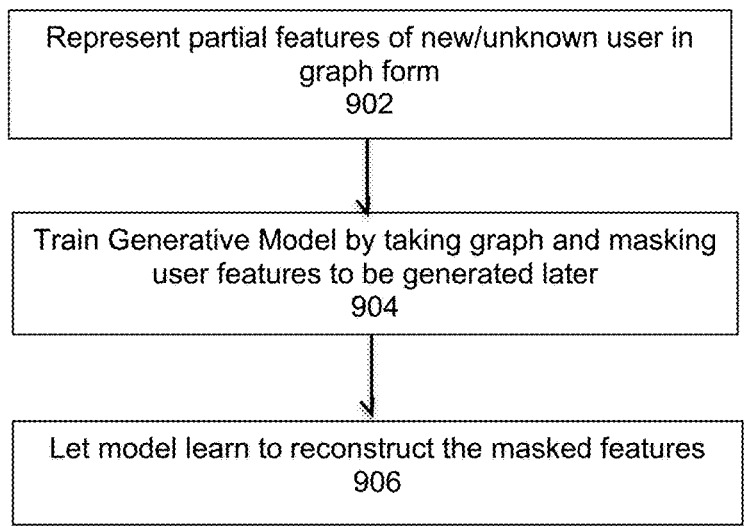

Represent partial features of new/unknown user in graph form
902

Train Generative Model by taking graph and masking user features to be generated later
904

Let model learn to reconstruct the masked features
906

FIG. 9

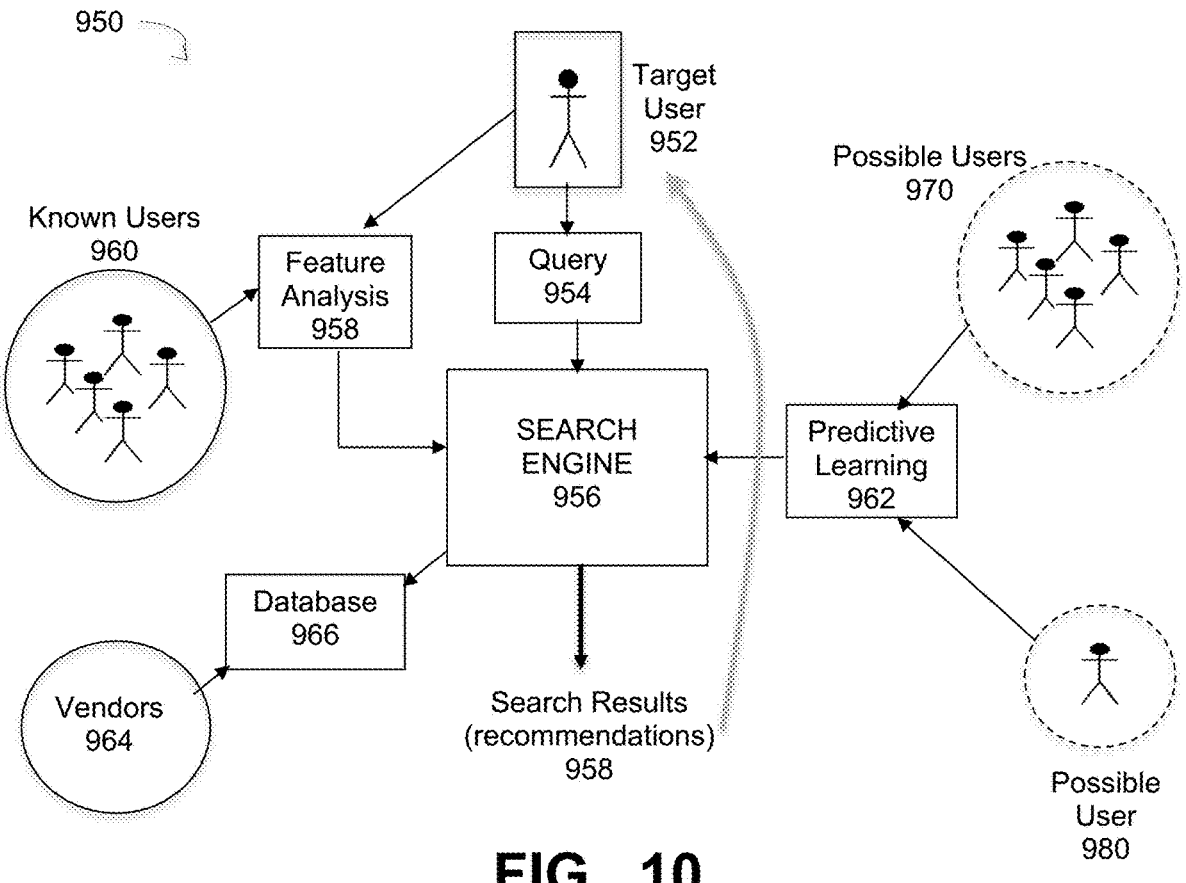

950

Target User 952

Known Users 960

Feature Analysis 958

Query 954

Possible Users 970

SEARCH ENGINE 956

Predictive Learning 962

Database 966

Vendors 964

Search Results (recommendations) 958

Possible User 980

FIG. 10

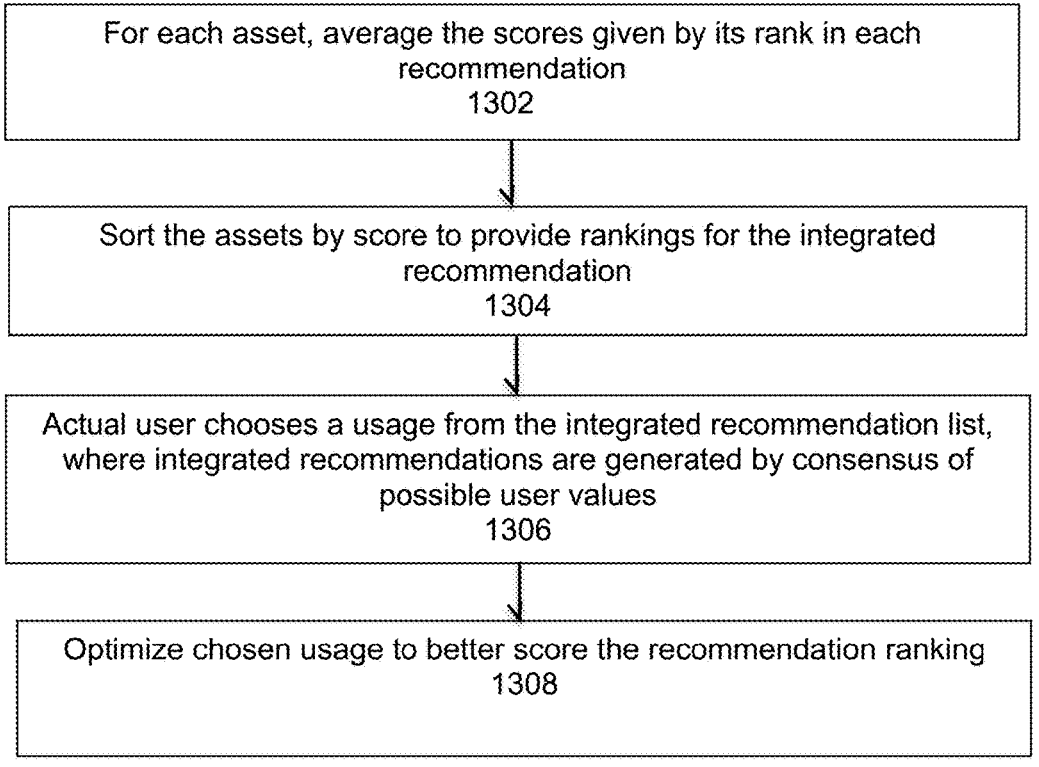

For each asset, average the scores given by its rank in each
recommendation
1302

Sort the assets by score to provide rankings for the integrated
recommendation
1304

Actual user chooses a usage from the integrated recommendation list,
where integrated recommendations are generated by consensus of
possible user values
1306

Optimize chosen usage to better score the recommendation ranking
1308

FIG. 13

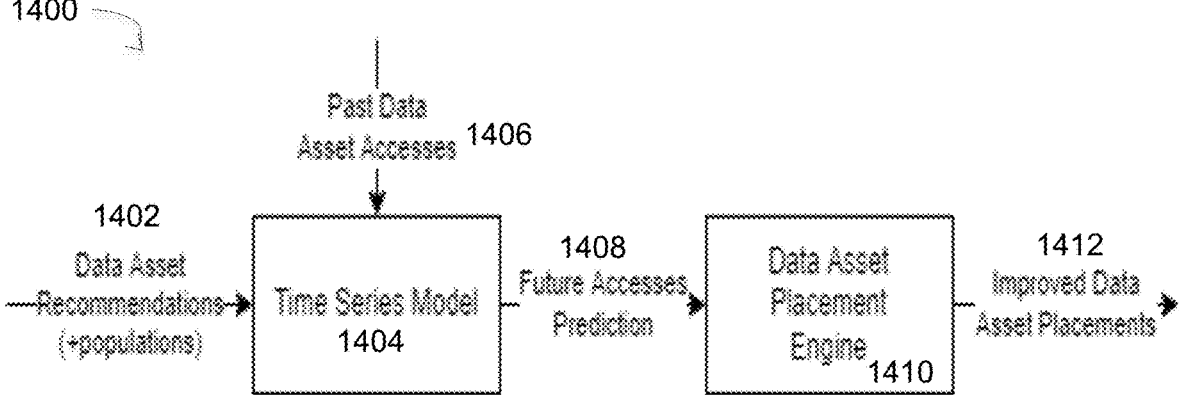

FIG. 14

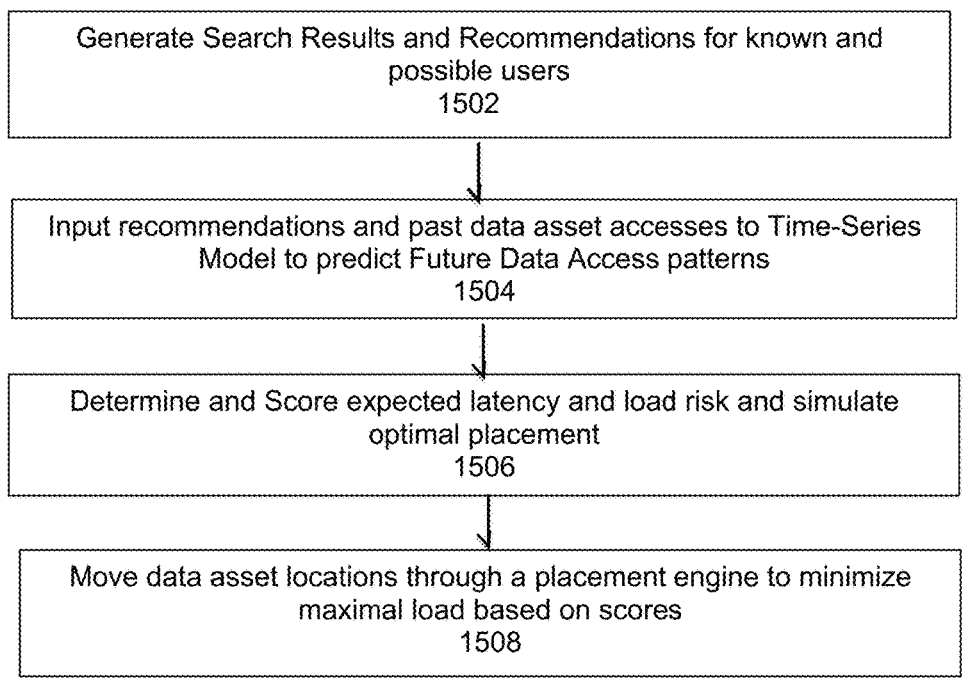

Generate Search Results and Recommendations for known and
possible users
1502

Input recommendations and past data asset accesses to Time-Series
Model to predict Future Data Access patterns
1504

Determine and Score expected latency and load risk and simulate
optimal placement
1506

Move data asset locations through a placement engine to minimize
maximal load based on scores
1508

FIG. 15

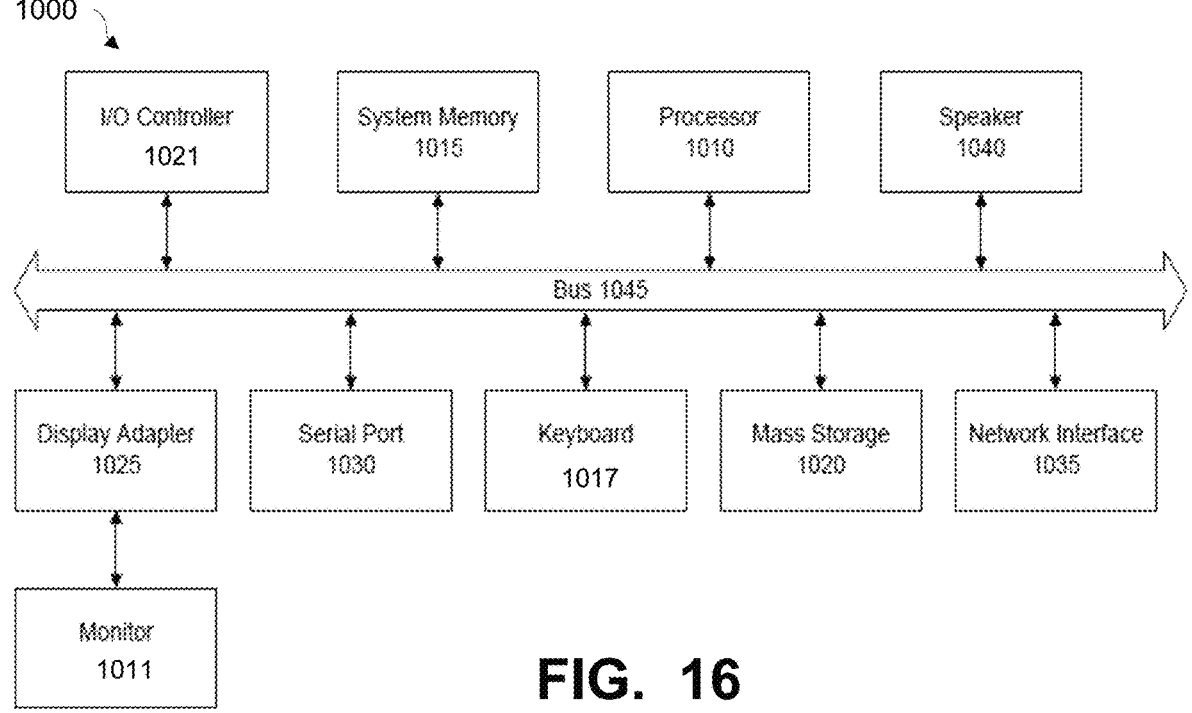

1000

| I/O Controller 1021 | System Memory 1015 | Processor 1010 | Speaker 1040 |

Bus 1045

| Display Adapter 1025 | Serial Port 1030 | Keyboard 1017 | Mass Storage 1020 | Network Interface 1035 |

Monitor
1011

FIG. 16

SEARCH AND RECOMMENDATION ENGINE ALLOWING RECOMMENDATION-AWARE PLACEMENT OF DATA ASSETS TO MINIMIZE MAXIMAL LOAD

CROSS-REFERENCE TO RELATED APPLICATIONS

This application is a Continuation-In-Part application and claims priority to U.S. patent application Ser. No. 17/871, 843 filed on Jul. 22, 2022, entitled "Search Engine Using Self-Supervised Learning and Predictive Models for Searches Based on Partial Information," which in turn is a Continuation-In-Part application and claims priority to U.S. patent application Ser. No. 17/711,839, filed on Apr. 1, 2022, which in turn, is a Continuation-In-Part application of U.S. patent application Ser. No. 15/084,324, filed on Mar. 29, 2016 and entitled "Recommendation Systems for Data Assets in Federation Business Data Lake Environments" and which is hereby incorporated by reference in its entirety.

TECHNICAL FIELD

Embodiments are generally directed to search engine technology, and more specifically to processing search queries for data stored to optimize placement of data assets among data centers.

COPYRIGHT NOTICE

BACKGROUND

Enterprise organizations face vast amounts of information pouring in at all times and need a way to leverage big data analytics in order to gain critical insights. Effectively utilizing big data poses significant process and technical challenges. The federation business data lake platform (FBDL), such as that developed by EMC Corporation, enables organizations to realize the value of analytics in much shorter time frames than normal (e.g., weeks or days as opposed to months). Using this platform, businesses are able to ingest, store, analyze, surface, and act on big data to make more informed decisions that could lead to real-time insights, better efficiencies, and new revenue streams.

The FBDL platform provides a central repository for all enterprise data in large organizations using big data (Big Data) processes and data sets. However, consolidation alone is only a first step to ensure effective utilization of data resources. Next steps typically involve documentation, governance and security policy. At present, however, no adequate solutions are provided for the process of data reuse and exploration (i.e., "punching holes through silos") beyond simple metadata search or breadcrumb audit trails of past users. As a result, users are not able to use many of the tools and solutions available throughout the system because they are typically not aware of existing data assets, such as sources, parsers, dashboards, and so on.

In most organizations, users typically only use data they are familiar with and retain old data warehousing practices.

Furthermore, these organizations are typically divided into hierarchical and/or separate departments or business units, which are effectively organizational silos with respect to data searching and processing. Many data assets reoccur and overlap, and users typically do not leverage past practices, or practices in other business units regarding these data assets. Present platforms thus do not provide easy data collaboration between business units, which represent organizational silos, and any leveraging of data requires long manual efforts to identify relevant data assets for use by querying users. As a result, users are effectively fishing blindly through ever increasing amounts of data and data assets. Such inefficient collaboration wastes time effort and cost and generally reduces business efficiencies and innovation.

Finding data in present systems typically involves using a keyword-based search engine that simply matches query terms entered into the search engine with instances of the terms in the searched data assets. A certain number of data assets containing a highest number of matches is then returned to the user, who must then access and evaluate each returned data asset. These present search engine systems do not adequately utilize or leverage useful relationships between users querying the system and between certain users and the various different data assets. Such information can be exploited to more efficiently respond to queries by returning responses that are more relevant than those based on simple keyword matches.

The latency of search engine systems depends on the time needed to search databases and return responses to the computer of the querying user. In modern systems, data can be stored in any number of data centers that may be located in various different geographic locations, some of which may be large distances (e.g., many hundreds or even thousands of miles from a user). Optimum placement of data assets most likely to be responsive to searches in locations closer to a user would greatly minimize the latency of the search system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 9 is a flowchart that illustrates a process of using a generative model to perform searches using only partial information of features for a searching user, under some embodiments.

FIG. 10 illustrates a system implementing a search engine that processes features for both known and possible users to generate search results and recommendations for a target user, under some embodiments.

FIG. 13 is a flowchart illustrating a process of generating an integrated recommendation using a consensus mechanism, under some embodiments.

FIG. 14 is a block diagram of a system using recommendations as factors in data asset placement, under some embodiments.

FIG. 15 is a flowchart that illustrates a process of optimizing data asset placement, under some embodiments.

FIG. 16 is a system block diagram of a computer system used to execute one or more software components of the methods and processing component described herein, under some embodiments.

DETAILED DESCRIPTION

Figure 1:
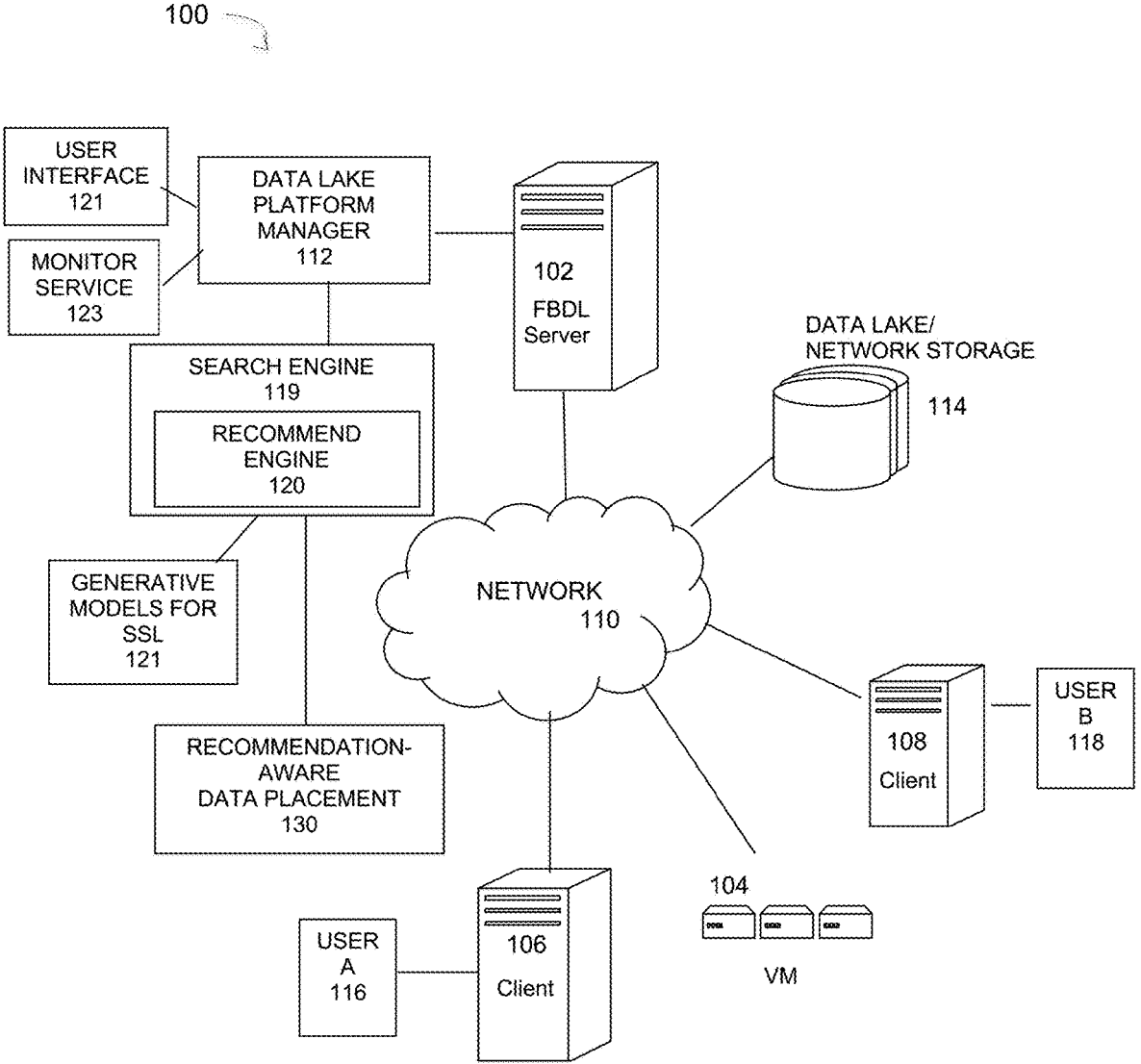
FIG. 1 illustrates a computer network system that implements one or more embodiments of a search engine used in a data lake storage system, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

FIG. 1 illustrates a computer network system that implements one or more embodiments of a data lake search engine and recommendation system, under some embodiments. In system 100, client and server computers are coupled directly or indirectly to each other and other network elements through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application.

The data generated or sourced by system 100 may be stored in any number of persistent storage locations and devices, such as network storage 114. A backup process backs up this data to storage devices of the network, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices.

The data stored and processed in system 100 may be any appropriate data, such as database data that is part of a database management system. In this case, the data may reside on one or more hard drives and may be stored in the database in a variety of formats. One example is an Extensible Markup Language (XML) database, which is a data persistence software system that allows data to be stored in XML format. Another example is a relational database management system (RDMS) which uses tables to store the information.

In an embodiment, system 100 represents a FBDL system that includes a large repository of data storage devices 114 which are accessed by a large numbers of users each operating respective client devices, such as users 116 (user A) and 118 (user B). System 100 represents a big data environment that includes data analytics processes used by a plurality of different users. The users are typically part of a very large organization (e.g., company, governmental agency, conglomeration, etc.) that may be referred to as an "enterprise" and that is organized into a number of different business units, such as sales, engineering, customer service, and so on. Many different structures are possible depending on the organization's size, type, hierarchical configuration, and so on, but are typified by a separation of employees and personnel into a number of separate and autonomous or semi-autonomous groups or departments. For purposes of data processing within the organization, such departments are often considered to be organizational silos, which imply that data within each department is utilized and processed internally without much interaction with other departments.

The organizational silo model is generally acceptable for smaller organizations that deal with reasonable size datasets and/or have adequate centralized control. As the size of the enterprise grows and the amount of data increases to very large scales, such siloing can become disadvantageous, especially in present big data environments that use huge data repositories, i.e., "data lakes." Big data generally refers to data sets that are so large (e.g., terabyte scale datasets) or complex that traditional data processing and interchange applications are inadequate. Special programs are thus used for various data processing tasks, such as data capture, analysis, storage, transfer, virtualization, querying, security, and so on. Users often use applications or programs to run predictive analytics or certain other advanced methods to extract value from data, which can be very large and/or complex sets of data.

Figure 2:
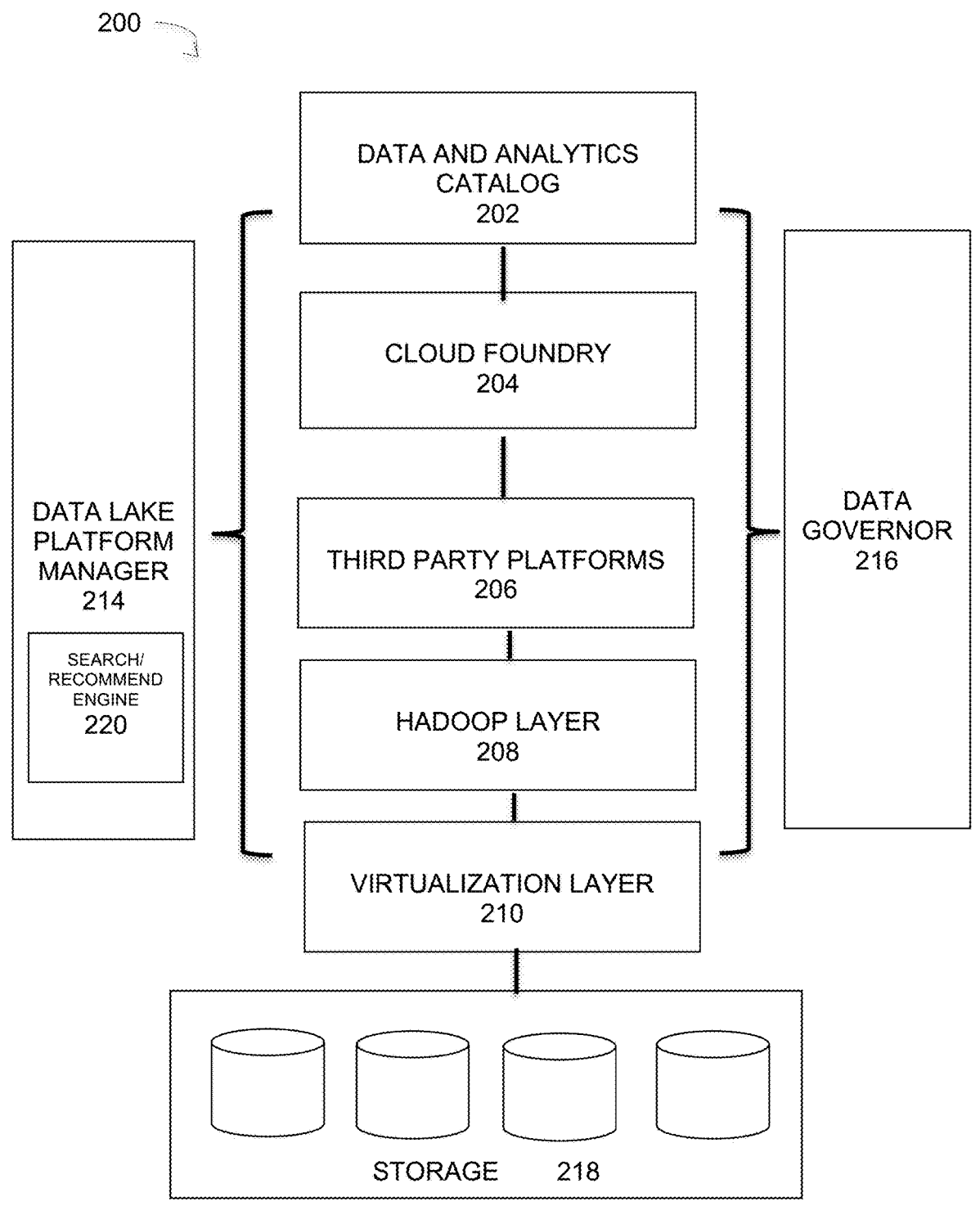
FIG. 2 illustrates components of a federation business data lake platform under some embodiments.

Server 102 represents and FBDL server that executes the FBDL platform manager process 112, which is a hardware and software solution that enables businesses to deploy big data at scale, quickly and securely, across the enterprise. The FBDL platform consists of various layered infrastructure components, as shown in FIG. 2. As shown in FIG. 2, the layers of system 200 include a data and analytics catalog 202, cloud foundry 204 which provides a platform for cloud applications, third party application and platforms 206, a Hadoop layer which is an ecosystem of open source components that controls storage, process, and analysis of the data, a virtualization layer 210, and the physical storage 218. A data lake platform manager 214 and data governor 216 control the layers of system 200. The data governor 216 dictates the security and access restrictions to the data within the system, such as LDAP (lightweight directory access protocol) rule engines. In an embodiment, the search and recommendation engine 220 is a functional component with the platform manager 214, and may be implemented as a plurality of program routines or modules, or hardware components executing program instructions.

The FBDL platform 200 provides a consolidated storage space for an enterprise, with effective support for all major platform challenges through the federation of the services shown in FIG. 2 and third party vendors. The FBDL server and platform provide wide-ranging data access and control services, such as security, governance, auditing, and cataloging, among others. These services generally ensure that even if the data lake is huge and full of complex data, users can find what they need if they know what to look for. Using traditional FBDL processes, however, users in relatively strictly defined business units cannot easily leverage data from other business units without tedious manual effort to identify relevant data assets; thus collaboration is a continuing challenge in large enterprises and redundant activities with regard to data interaction are often encountered by different business units or groups of users throughout the enterprise. Such redundancies are especially prevalent among enterprises with wide geographic spread, large numbers of well-defined and separate departments, and so on. To overcome the traditional problems of data collaboration and use among different business use, the FBDL platform implements certain mechanisms to improve data collaboration among business units, and effectively punch through the organizational silos constructed around business units and perpetuated by retention of old data warehousing practices.

As shown in FIG. 1, the FBDL includes a search engine 119 and recommendation engine 120 that provide each of its users personalized suggestions on data, parsers, dashboards, models, queries, and other form of data assets based on their past behavior and the accumulated knowledge gained by all others. The recommendation engine 120 relies on past data retrieval behavior of different users, as well as the current user behavior. The basic assumption behind the operation of the recommendation engine is that if user A and user B have similar behavior, then user A's knowledge can help guide user B. The search engine 119 processes queries input by a user to find documents in the data lake that are most responsive (relevant) to the query for evaluation by the recommendation engine 119. In an embodiment, the search and recommendation functions of the search engine 119 may be provided as separate processing functions and components, or they may be integrated into a single component that may be referred to interchangeably as a search engine or recommendation engine.

In an embodiment, system 100 includes a search engine 120 that examines a body of data (e.g., a data lake), such as the FBDL, in a systematic way for particular information specified in a textual search query input by a user. The body of data may be World Wide Web content, such that the search engine performs web searches, or it may be any other body of accessible data, either public or private. The search engine may employ one or more indexing schemes that associate words and other definable tokens to location or storage information (e.g., associating web pages to their domain names and HTML-based fields). A query from a user can be a single word, multiple words or a sentence, and the index helps find information relating to the query as quickly as possible. A user enters a query into the search engine as one or more keywords, and the index already has the names of the sites or locations containing the keywords, and these are instantly returned in response to the query from the index. If more than one response is returned for a query, they can be ranked in order of most to least relevant to the query based on number or closeness of keyword matches, and so on. As mentioned above, the recommendation engine 120 may be a component within the search engine 119, or vice-versa. Similarly, both of these engines could be provided as separate functional components in system 100.

Figure 3:
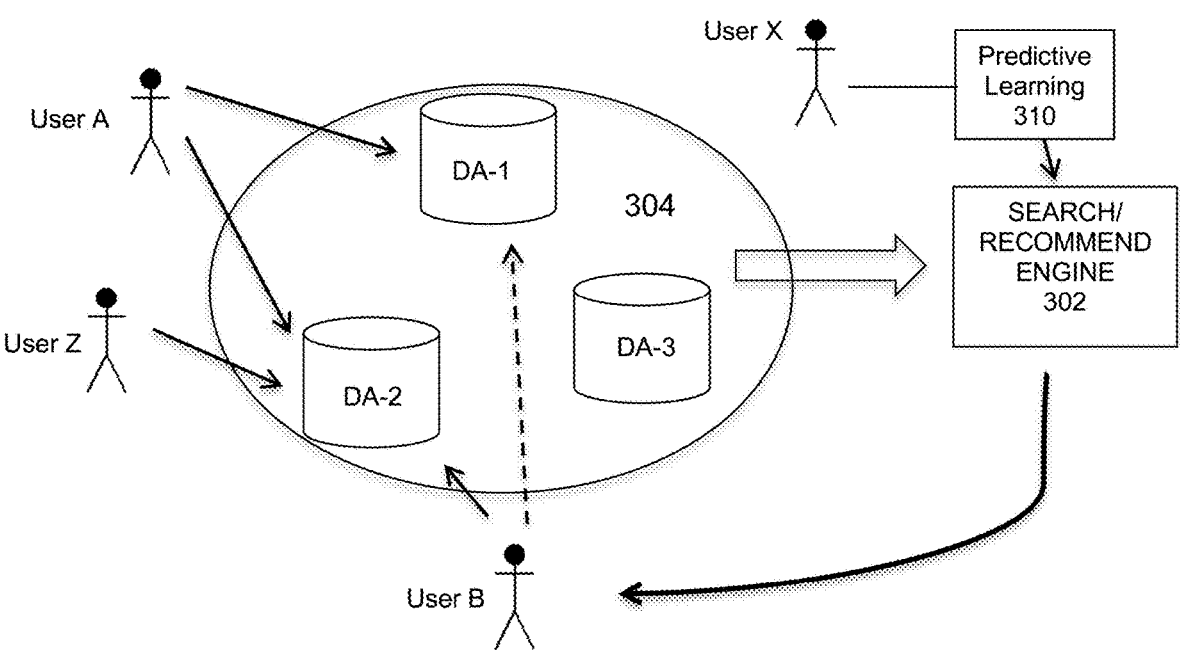
FIG. 3 illustrates operation of a search/recommendation engine in an FBDL environment under some embodiments.

FIG. 3 illustrates operation of a search and recommendation engine in an FBDL environment under some embodiments. As shown in FIG. 3, a number of users, denoted User A, User Z, and User B interact with a number of different data assets (DA-1, DA-2, and DA-3) in data lake 304. The data assets may represent any type and format of data, such as data in databases, file systems, function codes, or even applications and any data related resource that may be used by any user in the system. The interactions may be any action that views, accesses, queries, modifies or processes the data comprising any data asset. The interactions may be of any resolution, such as simple queries, analysis activity, accesses to directories, files, documents, individual data elements, and so on. In general, the system can be configured such that any activity that triggers a data storage read/write cycle will be considered an interaction. Alternatively, certain activities or resolution limits may be applied to limit the amount of data processed by the system.

In an embodiment, each interaction by a user with an asset is counted to provide a mathematical (scalar) value. This allows the recommendation engine to make a search of relevant (to a given user) data assets (sources) more efficient. The search engine 119 comprises a data collection mechanism that provides a basis of counting queries done by users on the data assets. For each query that is done against a given data assets, the recommendation engine process will increment by one a counter that describes the number of interactions that a user (user x) had with a particular data set (data set y). Table 1 below illustrates an example of user interaction counts for n users against m data assets.

User 7 can be the same person in a different time and/or role, and is thus treated as two different 'users.' The interaction count data as exemplified in Table 1 is used to calculate a similarity metric, as described in greater detail below.

The various interactions throughout the system among all of the users and all of the data assets are monitored and input to the search/recommendation engine, 302. The engine 302 (or other component of the FBDL system) creates and maintains a profile of each user or groups of users. The recommendation function of engine 302 generates a relevance score to past interactions carried out by other users. The highest rating records of interaction will be provided as a possible data asset of interest and be presented as a recommendation to the user. For the example of FIG. 3, User A from a certain business unit queries the data lake or accesses data in data assets 1 and 2, while User from a different business unit queries data asset 2. These interactions are input to search/recommendation engine 302 for feedback to User B from yet another data unit. The interaction data will also be combined with other metadata associated with the data assets (e.g., owner, data steward, lineage, etc.) to provide a basis for recommending other data assets that may be used by User B. Thus, User B may be recommended to use data asset 1 based on a similarity with User A. In this manner, the recommendation engine relies on past data retrieval behavior of different users, as well as the current user behavior. It uses the assumption that if user A and user B have similar behavior, then A's knowledge can help guide B.

Figure 4:
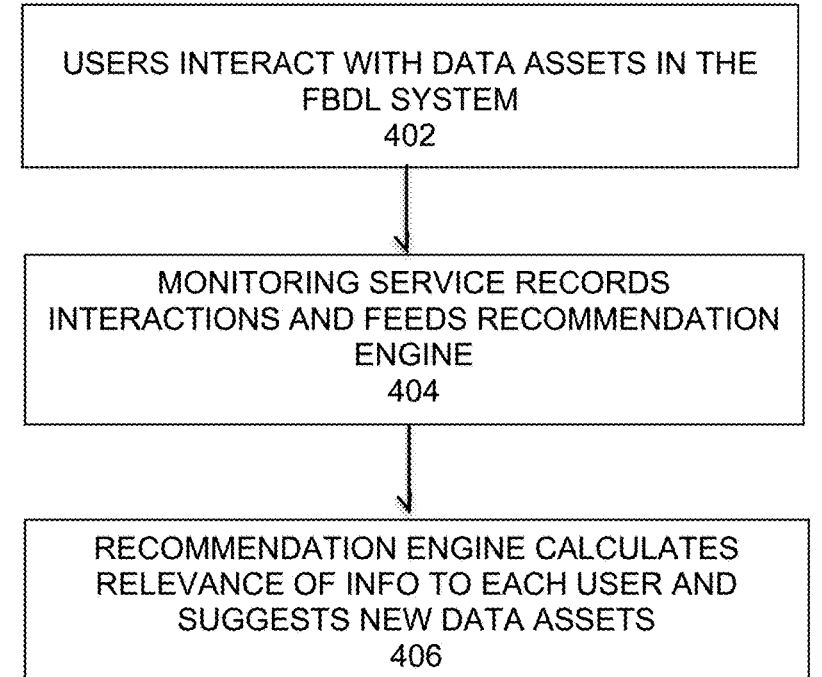
FIG. 4 is a flowchart that illustrates a method of searching for and recommending data assets to users in an FBDL environment under some embodiments.

FIG. 4 is a flowchart that illustrates a method of recommending data assets to users in an FBDL environment under some embodiments. As shown in FIG. 4, the users interact

TABLE 1

|  | Data 1 | Data 2 | Data 3 | Data 4 | Data 5 | Data 6 | Data 7 | . . . | Data m |
|---|---|---|---|---|---|---|---|---|---|
| User 1 | 0 | 8 | 197 | 0 | 0 | 803 | 0 | . . . | 0 |
| User 2 | 0 | 0 | 0 | 125 | 547 | 0 | 0 | . . . | 0 |
| User 3 | 0 | 0 | 152 | 0 | 0 | 721 | 200 | . . . | 0 |
| . . . | . . . | . . . | . . . | . . . | . . . | . . . | . . . | . . . | . . . |
| User n | 0 | 0 |  | 0 | 0 | 650 | 254 | . . . | 0 |

It is also necessary to consider the usage across time, so the process will generate a snapshot of these counts on a periodic (e.g., weekly) basis. The tabular raw count data is therefore not stored directly, but rather as an incremental value of a given week. This provides an ability to represent trend changes in the behavior of the user(s) across time, and not just the total interactions between a user and the assets.

This allows the system to accommodate changes in users and data assets. For example, users can change roles, use needs, or other context and any recommendation of data assets responsive to a user should take into account this contextual information when recommending a data asset. The periodicity is selected based on an assumption that in a given week (or other appropriate period), the user looks on data assets that sits within the same context. In addition, the system also maintains information about the role of the user, so that if a user switches to a different team and has a new role, the system will define him as a new user in the table so that his or her old interaction data is not mixed with their new interaction as they are not in the same context. Likewise, users are not always a user that is currently active, but can be a user that in the past used the data asset and is presently dealing with other data assets, and will thus have a new 'profile.' For example, in Table 1 above, User 5 and with data assets in the FBDL system. This interaction can comprise users querying data, making data requests, applying parsers, running analytics, and any other appropriate data interaction, block 402. A monitoring process or component of the FBDL management server records all of the user interactions and provides a feed to the recommendation engine, 404. The recommendation engine calculates the relevance of information to each user and suggests new data assets, block 406. The recommendation engine can be configured to provide recommendations under various intervals or conditions. For example, it can be configured to provide recommendations to a user constantly such as upon every interaction by the user, or it can be configured to provide recommendations upon a set time period or after a set number of interactions or queries. Alternatively, it can be configured to provide recommendations only upon request by the user.

In an embodiment, the recommendation engine uses the similarity between users with respect to interactions with the data assets and other factors, such as user profiles, roles in the organization, connections, and so on to determine which data assets the target user may benefit from accessing based on similar users and makes recommendations on this basis. The system takes the number of user interactions (e.g., queries, access requests, etc.) and builds user profiles of each user. A user-based collaborative filtering component calculates the correlation between pairs of users, and such metrics may be calculated and stored for all possible pairs of users in the system. The degree of similarity between users and a specific target user is determined and a defined number of similar users form a cluster of users that are the most similar to the target user. Based on these users and their interactions, data assets are recommended to the user. As an example, consider an analyst denoted User A who was working on creating a resource for combining the services requests and sales leads of the enterprise's customers, and another analyst denoted User B who wants to identify market segmentation for her core technologies division customers. In theory User B could simply ask User A for help, but the reality is that in a typical organizational structure he would not be aware of User A's work. In this case, User B would probably have to start his segmentation process from scratch every time. However, if his queries were very similar to those used by User A, the recommendation system would recommend User A's data assets to him automatically. The system has determined that User A and User B are sufficiently similar so that the interactions of each can be used make recommendations for the other. The recommendation engine provides each of its users a personalized suggestion based on their past behavior and the knowledge gained by others, and thus represents an effective collaboration tool and efficient data location method.

Figure 5:
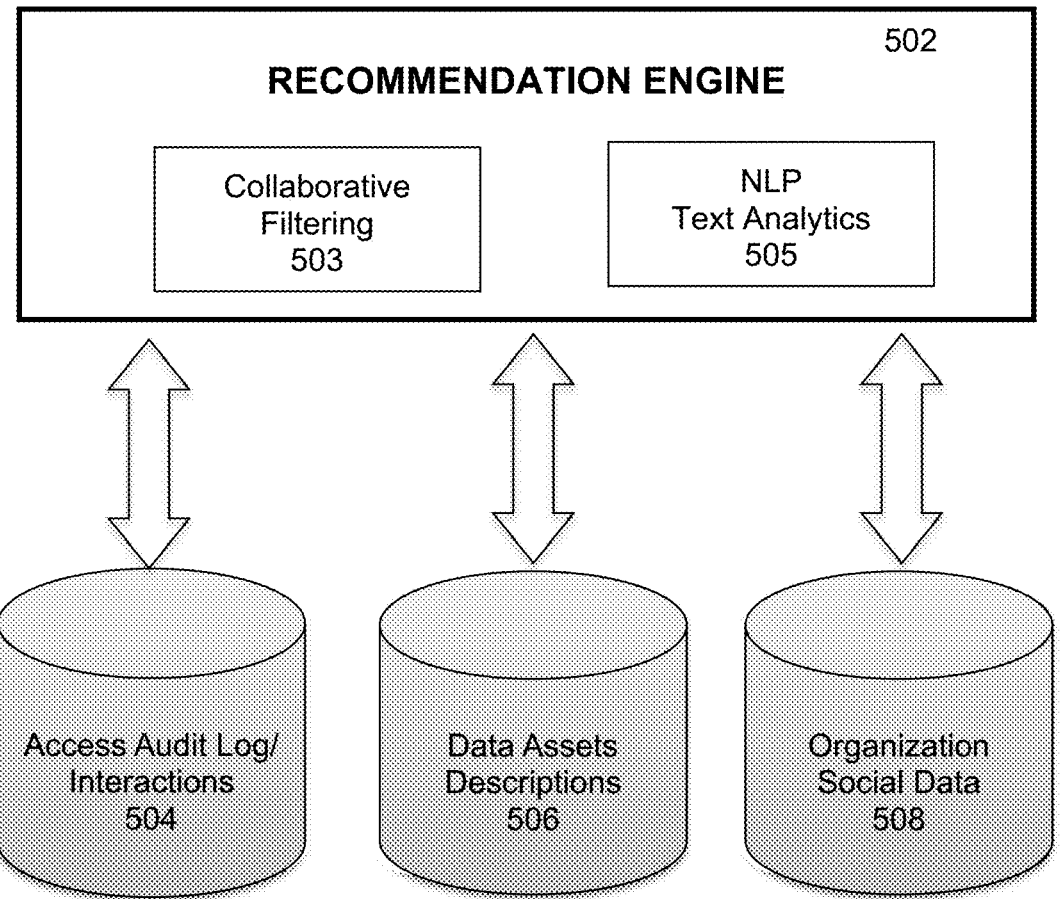
FIG. 5 illustrates a composition and operation of a recommendation engine under some embodiments.

FIG. 5 illustrates a composition and operation of a recommendation engine under some embodiments. As shown in FIG. 5, the recommendation engine receives information from a number of data sources. One data source is the access audit log or logs 504 that log all interactions of the users with the data assets in the FBDL system. Another data source is the data asset descriptions or descriptors 506 that describe or categorize the data assets in terms of type, organization, content, and other relevant parameters. The third data source is the organizational social data 508, which stores all of the formal and informal social information shared among users in the system. These can include any appropriate source, such as forums, chat rooms, social media postings, interactive help desks, and so on.

The recommendation engine 502 receives the input from the data sources and includes a collaborative filtering component 503 and a natural language processing (NLP) component 505, among other components, for processing the inputs from the data sources. The collaborative filtering component 503 processes the information for social collaboration. The NLP component 505 performs text analytics to produce the recommendation of data assets to a target or subject user (user of interest).

Figure 6:
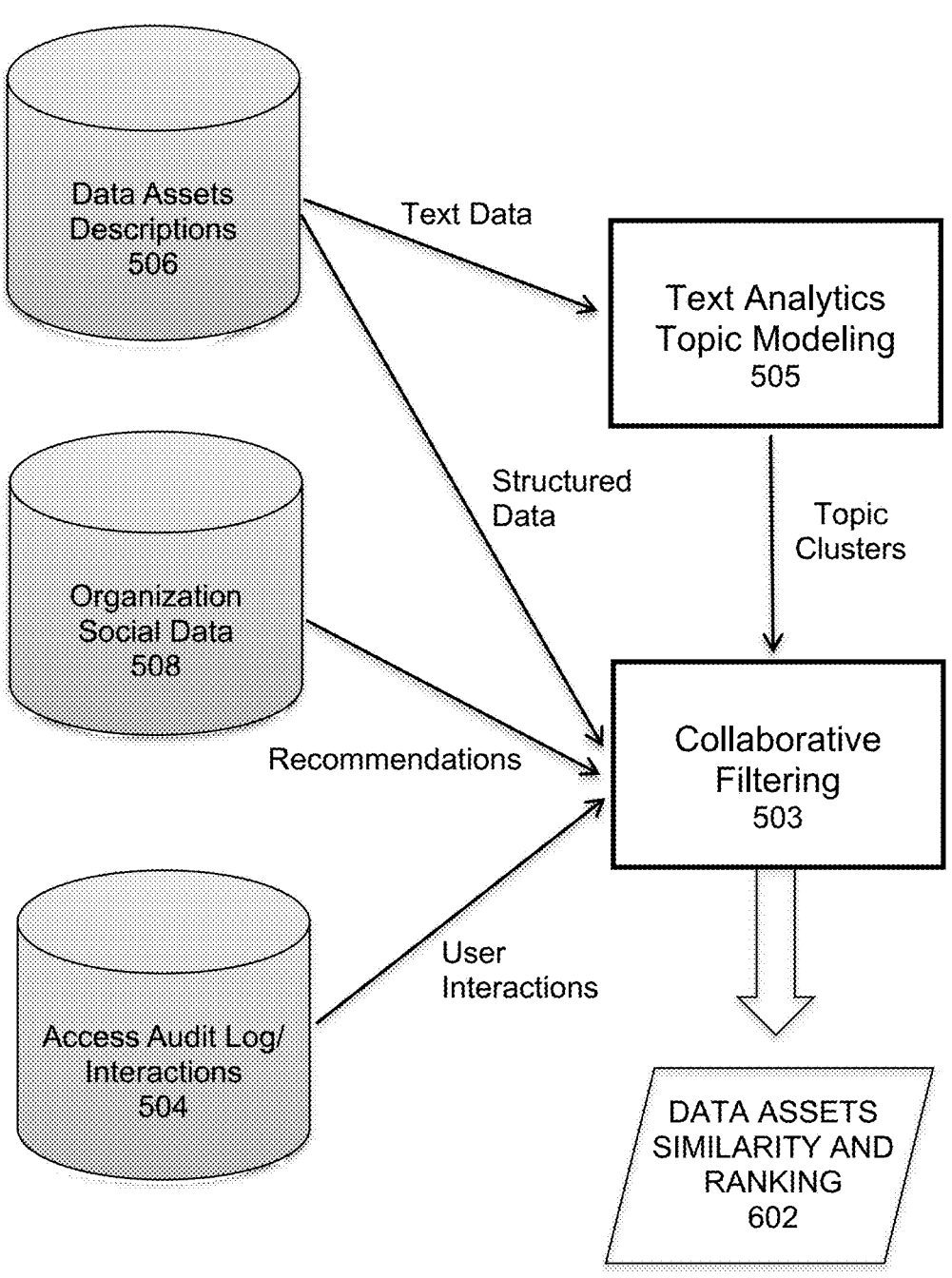
FIG. 6 illustrates the processing of data in the recommendation engine of FIG. 5, under some embodiments.

FIG. 6 illustrates the processing of data in the recommendation engine of FIG. 5, under some embodiments. As shown in FIG. 6, the three data sources, the data assets descriptions source 506 provides data in the form of text data to a text analytics (topic modeling) component 505, and in the form of structured data to the collaborative filtering component 503. The output of the text analytics module 505 is provided to the collaborative filtering component 503 as topic clusters that represent the data assets as accessed by the users. The social data source 508 provides its data in the form of recommendations to the collaborative filtering component 503. In an embodiment, an analysis component parses all of the data comprising social data 508 and pulls information relating to data assets associated with each user. These then form the basis of the recommendations sent to the collaborative filtering component. For example, a social media platform in which certain users refer to (and not just interact with) data asset would be marked as a data asset associated with that user for purposes of similarity calculations. The audit log source 504 provides the direct information regarding user interactions. The audit log can be configured to store interaction data resulting from user queries, read/write (R/W) operations, downloads, etc., in a standard format and for any resolution of interaction with regard to data set size and type of interaction. The audit log also contains a history of the target user's own interaction usage. In this manner, historical data for the target user himself is factored into recommendations for present data asset interaction.

With respect to the audit log 504 processing, the recommendation engine can be configured to parse the log to normalize the input in a pre-processing step. This normalized data input as a defined data structure to the collaborative filtering engine 503, which then processes the various inputs [Data_Asset_Text_Data+Data_Asset_Structured_Data+ Recommendations+User_Interactions+Topic_Clusters] to form an output comprising data assets similarity and ranking 602.

In an embodiment, a function for calculating an amount of interaction of a particular user with a particular asset may be given as shown in Equation 1:

$$\overline{v_i} = \frac{1}{|I_i|} \sum_{i \in I_i} v_{i,j}$$

where:
  $v_{i,j}$=number of interactions of user i with data asset j (e.g., from Table 1);
  $I_i$=data assets that user i has accessed; and
  $|I_i|$=a scalar value denoting the number of assets that user i has accessed;
  In this Equation 1, The number of interactions, $v_{i,j}$, equals the count number, such as derived from Table 1, for each user i against each asset j. The calculated value, $\overline{v_i}$ is the mean vote for user i and is the sum of the number of interactions ($v_{i,j}$) multiplied by the reciprocal of the number of assets that the user has accessed, and this mean vote value represents the average amount of interactions per asset by user i. For example, if the number of assets interacted with by a user is five then the, scalar value $|I_i|$=5, and the summation value is multiplied by $\frac{1}{5}$ to get the average amount of interactions for the assets.

The predicted relevancy of data item j for "active user" a is a weighted sum (where c is a normalization factor), and is calculated as shown in Equation 2:

$$p_{a,j} = \overline{v_a} + c \sum_{i=1}^{n} w(a, i)(v_{i,j} - \overline{v_i})$$

where w(a,i)=the weight of similarity between users a and i. This weighting factor may be set to a default initial value (e.g., 1.0) and increased or decreased based on certain defined factors, such as an amount of interaction between the users, objective similarities of the users (e.g., age, affiliation, gender, etc.), and so on.

This calculation of Equation 2 represents and may be presented to the target user in the form of ranking suggestions for one or more data assets for interaction by the target user. With respect to the above equation, the process presents to the user the top k data assets, that is, those with the highest prediction value, p. The recommendation engine analyzes the data assets and tries to predict for the target user based on similar users ranked by their data asset interactions. A pre-defined maximum number of data assets (e.g., 5 to 10) may be recommended to the user based on the needs and constraints of the system.

The recommendations may be output to the target user through a GUI (graphical user interface 121) using known GUI principles and technology. The output of the collaborative filter engine 503 may first be passed through other data asset filtering processes that may be defined by other processes of systems 100 and 200. For example, access to certain data assets may be strictly restricted to personnel, as defined by LDAP security and policy protocols, and other similar processes, such as implemented in data governor 216. In this case, the recommendation output 602 is first sent through a LDAP process to determine if the target user is restricted from interacting with any of the recommended data assets. If so, such data assets are removed from the recommendation list. The LDAP and other filtering processes may be applied earlier in the process as well, such as during the formation of the user profiles or the similarity ranking stage among users, for example.

Figures 7, 8:
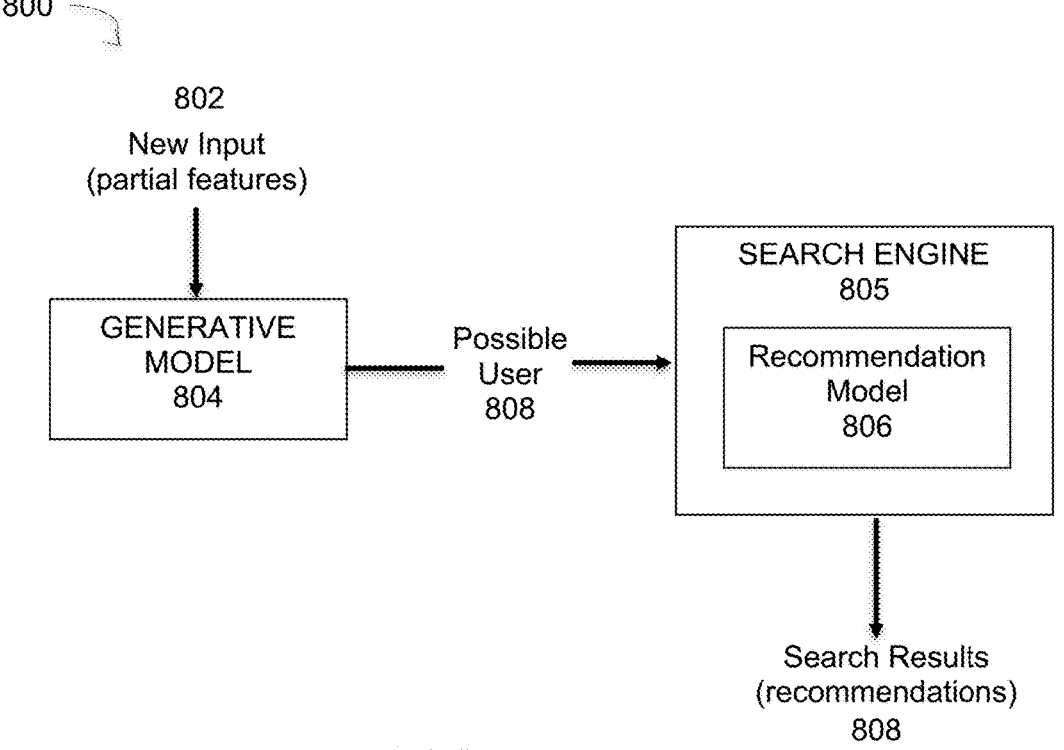
FIG. 7 illustrates a portion of an example Table that stores user interactions with data assets under some embodiments.
FIG. 8 is a system that includes a generative model to perform searches using only partial information of features for a searching user, under some embodiments.

The similarity among users is primarily calculated based on data asset interactions. Such interactions for all users and data assets may be stored in a relatively simple (but likely very large) Boolean table. FIG. 7 illustrates a portion of an example Boolean table that stores data of user interaction with data assets under some embodiments. As shown in Table 700, each user (User A, User B, User C, etc.) has a row entry in the table, and each data asset (DA-1, DA-2, DA-3, . . . , DA-N) has a column entry in the table. Each user's interaction with a data asset is marked as a Boolean value, such as 0 for no interaction and 1 for interaction. Table 700 is intended to be an example of a data access data structure, and many other implementations are possible. This data access table is used to build a user profile for each user. Such a Boolean table 700 can be used to build an overall user count table, as exemplified by Table 1 above.

In an embodiment, other parameters are also used to build the user profile. These can include roles within the organization by department (e.g., Sales vs. Engineering vs. Manufacturing, etc.), informal associations (e.g., clubs, social networks, geographic location, etc.), gender, age, title, and any other parameter that may inform which data assets might be common among any pairs of users.

In an embodiment, the similarity ranking between any two users is calculated from a combination of the data asset interaction correlation, as well as any of the other parameters, according to a weighted or scaled combinatorial algorithm. The similarity of two users (A) and (B) can be calculated as a cosine similarity as follows in Equation 3:

$$sim(a, b) = \frac{A \cdot B}{\|A\|\|B\|}$$

In an embodiment, the recommendation engine may apply different combinatorial rules to determine similarity and/or recommendations based on the profile of the target user. For example, a senior target user may be tasked with specific projects within the company and may have a long history of data interactions for specific purposes. In this case, such a user may be provided recommendations based solely on the data asset interaction correlation with other users. In this case, the audit log input 504 would be the only or primary basis of similarity comparison with the other users. On the other hand, a new user with little or no meaningful history of data asset interaction and need learn about the data assets may be treated differently by the recommendation engine. In this case, similarities with other users may be determined based on phrases or text provided by the social data source 508 or by descriptions of data assets 506. In an embodiment, the process includes a dynamic process that automatically considers the profile of the target user (e.g., seniority, role, needs, etc.) to determine an appropriate similarity correlation based on the different data sources.

Certain optimization processes may be used to improve the similarity calculations. For example, the recommendation engine can use additional features that will include the user's role, years of experience, geographic location, organization, and so on. Certain machine learning and artificial intelligence tools can then utilize learning models to determine how likely a data asset in the FBDL is responsive to a given user query. For example, this can be done by fitting a model, such as an ensemble classification tree (e.g. XGBoost, RF, etc.) that was trained on the features and used the data assets that users interacted with in the past as the labels. This model can then generate a probability per each recommendation based on features such as user role, experience, organization, location, and so on. After the model starts to run and is built up, the process can enrich it using feedback. For example, if a user creates an interaction with the recommended asset, the weight of the relation between the asset to the user attributes can be increased, and so on. Using Generative Models for Searches with Partial Information Embodiments described above include search and data retrieval processes that rely at least in part on established or discovered usage and access patterns. In certain cases, however, this information is not available, such as in the case of new users or users for whom only partial information is available. Embodiments thus include methods that perform data searches and return results to provide recommendations for such new users or users with only partial information.

In general, there are two main ways to represent a usage pattern, such as the pattern of data accesses by users to data assets in a system, such as illustrated in FIG. 3. First is as a sequence of actions, where each action has its own representation with features relating to aspects such as time (or time difference since the last action), the action itself, the assets it interacted with, the actor, and so on. Second is a graph form where nodes constitute actions, assets and actors. The actor has an edge to all actions, actions have edges between them in sequence, and each action also has an edge to the data assets it affects.

Artificial intelligence (AI) and machine learning (ML) systems have progressed greatly with respect to learning from massive amounts of carefully labeled data in so-called 'supervised learning' contexts. However, comprehensively labeled data is frequently unavailable in many if not most applications. Self-supervised learning (SSL) has been developed to enable AI systems to learn from incomplete or partial data situations to provide what can also be referred to as 'predictive learning.'

Self-supervised learning (SSL) obtains supervisory signals from the data itself, often leveraging the underlying structure in the data. The general technique of self-supervised learning is to predict any unobserved or hidden part (or property) of the input from any observed or unhidden part of the input. For example, it is common in natural language processing (NLP) systems to hide part of a sentence and predict the hidden words from the remaining words. Similarly, it is also possible to predict past or future frames in a video (hidden data) from current frames (observed data).

Since self-supervised learning uses the structure of the data itself, it can make use of a variety of supervisory signals across co-occurring modalities (e.g., video and audio) and across large data sets, all without relying on labels. A method used to train NLP systems by masking or substituting some input words belongs to the category of contrastive methods. But they do not use the joint embedding architecture. Instead, they use a predictive architecture in which the model directly produces a prediction for y. One starts for a complete segment of text y, then corrupts it, e.g., by masking some words to produce the observation x. The corrupted input is fed to a large neural network that is trained to reproduce the original text y. An uncorrupted text will be reconstructed as itself (low reconstruction error), while a corrupted text will be reconstructed as an uncorrupted version of itself (large reconstruction error). If one interprets the reconstruction error as an energy, it will have the desired property: low energy for "clean" text and higher energy for "corrupted" text. This applies generally in the context of NLP (text), the same concepts can be also applied to graphs.

For deep models trained in supervised mode, when labeled samples are limited, self-supervised learning (SSL) has emerged as a way to make use of large amounts of unlabeled samples, such as for NLP applications. Recently, there is a trend to extend these successful techniques to graph data using graph neural networks (GNNs). Embodiments thus use techniques that extend SSL to graph data using graph neural networks (GNNs).

Embodiments of system 100 include a generative model component 121 that uses reconstructive SSL for graph representation to generate possible values for the missing features, where it is should be understood that a sequence is a subcase of a graph. Such a component is used by recommendation engine 120 of search engine 119 to return salient search results and provide recommendations for users of system 100 who may be new or for whom incomplete, little or only partial information is available. As shown in FIG. 3, there are a number of users, denoted User A, User Z, and User B whose profile and past interaction with a number of different data assets (DA-1, DA-2, and DA-3) in data lake 304 is known. Other users, such as user X may be new or unknown to the system. Certain objective information about the user (e.g., age, gender, residence, etc.) may be unknown, however more typically access patterns to data assets will not be known, especially in the case of new users. Users for whom full information is not known, but that may be modeled by the generative model are referred to as "possible users."

FIG. 8 is a system 800 that includes a generative model to perform searches using only partial information of features for a searching user, under some embodiments. In system 800, new input for a new or possible user comprising only partial features 802 is input to a generative model 804 for the possible user 808. The search engine 805 then processes any queries from this user to produce search results and recommendations 808 from the recommendation model 806.

The generative model is a model that includes the distribution of the data itself, and indicates how likely a given example is. For example, models that predict the next word in a sequence are typically generative models because they can assign a probability to a sequence of words. Formally, a generative model is a statistical model of the joint probability distribution P(x, y) on given observable variable x and target variable y.

For the embodiment of FIG. 3, the prediction concerns likely patterns of access of unknown user X with the data assets DA-x in federation data lake 302. These predicted access patterns are then used to generate similarity scores, as is down for the case of known users A, B, Z in which actual known (historical) access data is used for their respective similarity scoring. In this manner, data usage patterns can be predicted for any number of possible users, and this information can further help inform the search engine processing to return relevant results to a target user. In this manner, modeled behavior of possible users (instead of relying on only known users) can help formulate similarities that can refine the search engine process to return salient results and recommendations.

FIG. 9 is a flowchart that illustrates a process of using a generative model to perform searches using only partial information of features for a searching user, under some embodiments In an embodiment, the process of FIG. 9 begins by representing partial features of the new or possible user in graph form, 902. This is followed by model training. The generative model training is done by first taking the graph and masking the user feature or features that are to be generated later, 904. It then lets the model learn to reconstruct those features, 906. The information that is generated should basically replace missing values, i.e., those for which there is no information about the user. These constitute possible values that are likely to have been the user's if they were shared by the user. As such, they do not have parameters of their own, just their values. This could be, for example, the age of a user that has not supplied their age, but that can be deduced based on the information that has been supplied to the system, such as search patterns, educational level, and so on.

For this embodiment, only one value is provided to the generative model. This is basically the 'inference stage' of the AI model, so it may be considered to be an automatic process and no further processing is needed. For inference, the graph is provided with the partial features of the user and the trained model will reconstruct the missing information. This can then be used to generate a possible user 808 for input to the search/recommendation engine. Thus, as shown in FIG. 3, data from known users A, B, Z with respect to access to data assets is input directly to the search/recommendation engine 302, while data for a new or possible user X is predicted by predictive learning process 310 using SSL and generative model techniques for input to the search recommendation engine 302.

In this manner, system 100 uniquely uses generative algorithms to generate partial input to search and data asset recommendation engines to return search results and provide recommendation with only partial user data.

The embodiment described above uses one value for the generative model, that is, essentially a prediction for the target user based on likely possibilities for a single user for whom partial feature information is available. In an alternative embodiment, predicted for the target user is generated for a population of putative full users that the target may be based on partial feature information for these putative users, referred to herein as 'possible users,' where a population may be two or more possible users, but typically represents a statistically significant number of users.

For this embodiment, the process generates missing user features many times with different seeds to create a population of possible users. It is generally presumed that many of the possible users will have different final recommendations that needed to be selected amongst to derive the ultimate recommendation for the target user.

FIG. 10 illustrates a system implementing a search engine that processes features for both known and possible users to generate search results and recommendations for a target user, under some embodiments. As shown in FIG. 10, system 950 comprises a target user 952 who inputs a query 954 to search engine 956. The query can be to access and select products or services for offer by one or more vendors 964 and listed in databases 966. The query is typically not a specific text string that specifies an exact known item, but is rather an open-ended keyword phrase is susceptible to interpretation so that various different results are possible. The system analyzes features of the target user 952 as well as known users 960, where the features may be past searches, user interactions with the database, user interactions with each other, user profiles, product/service characteristics, user access patterns, and so on. The analysis process 958 analyzes the information from the known users 960 and the target user to formulate search results and recommendations 958 that are most relevant to the query, as described in the embodiments above.

For the embodiment of FIG. 10, information about possible users 970 and 980 are also processed to provide insight into possible characteristics that may inform the search engine processes. Such possible user data is used when there are no or very few known users 960, or for systems where the users are new or for whom only partial information is provided. In this case, a predictive learning process 962 based on a generative model and self-supervised learning techniques is used to provide predictions of possible user behavior to provide data for the search engine to use in formulating search results and recommendations 958. Embodiments described above involved predictions for a target user through an SSL engine that generates putative 'completions' for a possible user 980 that the target user may be in terms of features for the target user. Present embodiments apply similar techniques to a number or population of possible users 970, that is, to generate putative completions for full users that the target user may be) in terms of features for the target user.

In an embodiment, a consensus mechanism is used to create an integrated recommendation for the population of possible users 970. For this system, the population of possible users 970 represents a set of likely possibilities for the target user based on different feature values. Thus, the possible users 970 essentially model a number of different people that are integrated to form a recommendation for a single user 952. The population of users all have the same information (features) but have different values for unprovided, unknown, or partial information. The recommendation is integrated in the sense that it takes into account the population of likely possibilities for the single user. So the ultimate recommendation 958 for the target user 952 is based on many possibilities (i.e., the possible user group 970) of what this user could be with full information.

Figure 11:
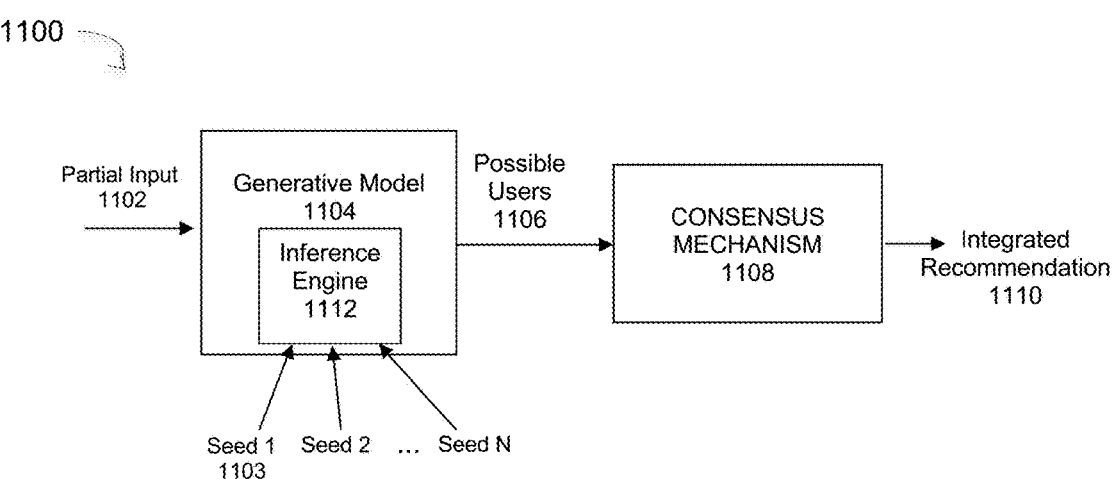
FIG. 11 illustrates expanding the generative model system for partial information of features for a searching user of FIG. 8 into a population of possible users, under an embodiment.

FIG. 11 illustrates expanding the generative model system for partial information of features for a searching user of FIG. 8 into a population of possible users, under an embodiment. As shown system 1100 of FIG. 11, a partial input 1102 is input into generative model 1104. This model has an inference engine that runs using a different random seed 1103, such as seeds 1-N. Each seed may result in a different possible user 970. The consensus mechanism takes the different feature values as possibilities for the users 1106 to generate an integrated recommendation 1110.

Figure 12:
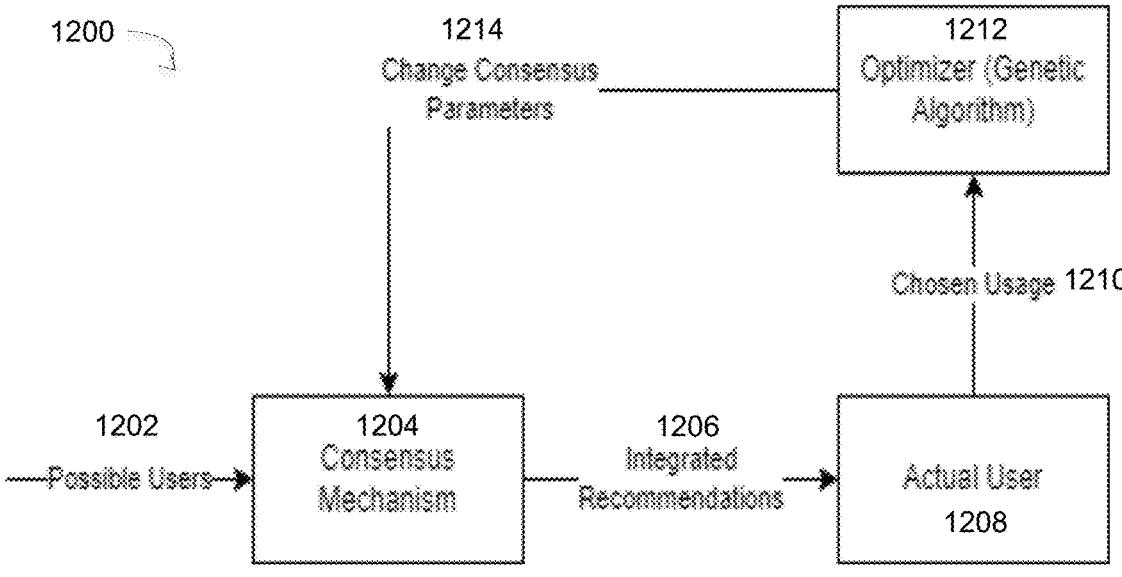
FIG. 12 illustrates a system having a consensus mechanism to create an integrated recommendation for the population of possible users, under some embodiments.

FIG. 12 is a block diagram of a system having a consensus mechanism to create an integrated recommendation for the population of possible users 970, under some embodiments. System 1200 uses a consensus mechanism 1204 on recommendations for a population of possible user input 1202 to provide an integrated recommendation, and optimize 1212 consensus parameters 1214 to improve future recommendations to thereby improve the integrated recommendations 1206 over time for the target user an system at large. The optimization may continue as long as desired to continually improve search results.

In an embodiment, the consensus mechanism outputs search results in the form of a ranked recommendation list. That is, a number of recommended results in a recommendation list by ranking, where each rank has its own score, with a fixed score for the first recommendation (if not in the ranking, the score is 0).

FIG. 13 is a flowchart illustrating a process of generating an integrated recommendation using a consensus mechanism, under some embodiments. Process 1300 starts by averaging, for each asset, the scores given by its rank in each recommendation, 1302. It then sorts the assets by score to provide the rankings for the integrated recommendation 1304. The actual (target) user 1208 chooses a usage 1210 from the recommendation list, 1306. In this case, usage is an interaction with specific data asset or assets, such as querying, updating, or managing, among others. This is the recommendation, which is called an 'integrated' recommendation because it is constructed from many recommendations corresponding to the many possible values 1202 of missing user features (as represented by population 970) using the consensus mechanism 1204 over the set of initial (pre-integration) recommendations. As shown in FIG. 12, these generated recommendations are shown to the actual user 1208 as a recommendation for which he or she chooses a usage 1210.

The chosen usage 1210 is then input to an optimizer component 1212, that allows the system to learn from this chosen usage 1110 an improved scoring for the recommendation ranking, 1308. The following Equation 4 illustrates the equation used by the optimizer 1212, under some embodiments to output the score (S) of the integrated recommendation as a scalar value.

$$\overline{\text{scorebyrank(recommendation)}} + \alpha\Sigma_{i=1}^{|ranks|-1}(\text{score}(\text{rank}_{i+1})-\text{score}(\text{rank}_i))^2 = S$$

In the above Equation 4, $\overline{\text{scorebyrank(recommendation)}}$ is the mean score by rank of the recommendations in the recommendation list, and $\alpha$ is a scalar value balancing between the aims for higher overall scores and diversity of scores among the ranks. The concept of 'balancing' is used as the optimization metric because otherwise the optimization would just increase all scores, and the optimizer optimizes the scores for each rank.

In an embodiment, a genetic algorithm is used for the optimizer 1212. A genetic algorithm (GA) is an optimization algorithm that is inspired from natural selection principles. It is a population based search algorithm, which utilizes the concept of survival of fittest. The new populations are produced by iterative use of genetic operators on individuals present in the population. The chromosome representation, selection, crossover, mutation, and fitness function computation are the key elements of GA. The procedure of GA is as follows. A population (Y) of n chromosomes are initialized randomly. The fitness of each chromosome in Y is computed. Two chromosomes say C1 and C2 are selected from the population Y according to the fitness value. The single-point crossover operator with crossover probability (Cp) is applied on C1 and C2 to produce an offspring say O. Thereafter, uniform mutation operator is applied on produced offspring (O) with mutation probability (Mp) to generate O'. The new offspring O' is placed in new population. The selection, crossover, and mutation operations will be repeated on current population until the new population is complete.

System 1200 iteratively optimizes the integrated recommendation by changing one or more consensus parameters to derive a final recommendation to the user based on the optimized integrated recommendation. In general, the optimization 1212 is done for the individual scores' rankings, and the optimization goal is seeing the user acting (e.g., selecting) more on higher-ranked integrated recommendations.

Embodiments use a consensus mechanism on recommendations for a population of possible input to provide an integrated recommendation, and optimize consensus parameters to improve future recommendations to thereby improve the integrated recommendations over time.

Recommendation-Aware Placement of Data Assets

As stated in the Background section, the latency of search engine systems depends on the time needed to search databases and return responses to the computer of the querying user. The proximity of data to the computer of a querying user can have an effect on this latency, can involve distance differences on the order of disks in an array, arrays within a data center, or data in different data centers. Embodiments of system 100 of FIG. 1 include a recommendation-aware data asset placement process 130 that facilitates optimum placement of data assets within a location to minimize latencies by leveraging recommendations generated by the search engine 119.

Deliberate and planned placements of data assets has been found to be important for improving latency of the systems. Present solutions may rely on past access patterns to help optimize data placement, however, no system is optimizing the placements by also taking into account the search engine results and data asset recommendations, as is provided by process 130. Using this process, a system administrator, vendor or other implementor is able to decide and dictate the location of data on a given disk, which disk in a data center to place it on, or even which data center should it be placed within. Other placement decisions can also involve placing data on a device with higher or lower operations SLA (service level agreement) in order to meet certain latency goals.

FIG. 14 is a block diagram of a system 1400 using recommendations as factors in data asset placement, under some embodiments. As shown in FIG. 14, past data asset access information 1406 and data asset recommendations generated from search engine results for known users and optionally a possible user or population of possible users (as described with respect to FIG. 10) are input as features to a time-series model 1404 that will predict future data access patterns 1408.

These predicted future data access patterns are then input to a data asset placement engine 1410 that will then orchestrate a movement of the locations or the positions of the data assets so that (1) the data asset is located at a location more easily accessed for the users that are likely to access it (minimizing latency), and/or (2) the data asset accesses will be more uniform in terms of the infrastructure that hosts the data assets (minimizing maximal load). Latency is generally understood to be the measure of the time it takes to perform an operation, and the time each specific part takes, and load risk represents how close the current load is to the system's SLA, such as may be dictated by the infrastructure/system provider.

A score constructed by the expected latency and load risk can be created by a weighted mean of these values, and then the placement optimization can be simulated with optimization methods, such as genetic algorithms, as mentioned above.

The resulting improved data asset placements 1412 can move data within a storage device, to a specific storage device within a data center, or even a certain data center among a group of data centers, depending on the scale of the asset placement parameters. Moving the data assets from one location to another can be performed through standard data migration techniques as desired.

In addition, the operating cost of moving a data asset can also be taken into account, and used as constraint for the optimization. The data assets can then be placed so as to minimize the latency (both by being closer to the relevant user and spread about so as to not have all requests go to one data center, and possibly with risk management by adding confidence intervals to the prediction).

FIG. 15 is a flowchart that illustrates a process of optimizing data asset placement, under some embodiments. As shown in FIG. 15 the process starts by generating search results and data asset recommendations in response to a target user query, using processes described above for features of known and/or possible users, 1502. The recommendations and past data asset access information are input as features to a time-series model for predicting future data access patterns, 1504. The system then determines an expected latency and load risk created by a weighted mean of these values and scores these risks, and then simulates the placement optimization using an optimization method (e.g., genetic algorithm), 1506. Using the scoring and simulation, a data asset placement engine is then used to move the locations of the data assets to minimize maximal load, 1508. With respect to ensuring latency, the system is configured to ensure that the latency does not exceed a threshold that will impact performance (e.g., on the order of seconds or minutes depending on system requirements); likewise, for maximal load, the system ensures that the load will not exceed a respective threshold as well. Furthermore, the load can be distributed so that the disks will be worn out at a similar rate. The system can even take into account the disks' current state and SLAs to even out the expected time to end-of-life.

With respect to scoring and latency, there could be data collected that would approximate the latency (or load) in different situations that will be used for the expected latency (or load). The scoring can be, for example, based on the mean latency (or load). It could also incorporate non-linear effects of high values (higher penalty) or measure the probability that a query will be over a certain threshold. This process can be configured to look at the applications that may use it, as some applications may put more or less value on the latency of data access. The simulation part can either be done as an actual simulation (accurate but expensive) or with function approximation (such as in a machine learning model).

Embodiments thus use data asset recommendations as features to improve the prediction capabilities of future data accesses for downstream improvement of data asset placement. This process improves data asset placement as affected in the future by current data asset recommendations.

The recommendation system for FBDL data assets as described herein allows users to leverage the knowledge gained by others while leveraging the entire enterprise data. Traditionally a time consuming task, the recommendation engine automates the process of determining user similarities and correlating data access interactions throughout the entire enterprise to make meaningful recommendations of likely data assets to target users. Unlike present solutions of data management in a lake environment that focus on data asset cataloging, governance and audit, none aim to improve collaboration between end users (that is, focus on the customer's IT department and not their business users). It provides context-based rather than content-based data management and is an important tool for punching holes through organizational silos. With respect to automatic guidance for data exploration, some existing solutions enable interactive reporting of other users' interactions with different datasets. However, none of them automatically guide the user for the relevant next step with respect to which data assets the user should access.

Embodiments of the processes and techniques described above can be implemented on any appropriate backup system operating environment or filesystem, or network server system. Such embodiments may include other or alternative data structures or definitions as needed or appropriate.

The network of FIG. 1 may comprise any number of individual client-server networks coupled over the Internet or similar large-scale network or portion thereof. Each node in the network(s) comprises a computing device capable of executing software code to perform the processing steps described herein. FIG. 16 is a block diagram of a computer system used to execute one or more software components of the present system described herein. The computer system 1000 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is only one example of a computer system suitable for use with the present system. Other configurations of subsystems suitable for use with the present invention will be readily apparent to one of ordinary skill in the art.

The network 110 may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11x, near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. Method steps may also be embodied as executable program code executed in a processor based system, such as a server computer or client computer coupled in a network. The terms, "component," "module," "procedure," "unit," "engine" may all refer to a circuit that executes program code to perform a function implemented in software.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media). In the context of this disclosure, a computer-usable medium or computer-readable medium may be any physical medium that can contain or store the program for use by or in connection with the instruction execution system, apparatus or device.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of optimizing placement of data assets in a data retrieval system storing data assets for users in an enterprise, comprising:
    generating search results and data asset recommendations in response to a target user query;
    providing the recommendations and past data asset access information for data assets as features to a time-series model for predicting future data access patterns by the target user;
    determining and scoring an expected latency and load risk created by a weighted mean of these expected latency and load risk values;
    simulating a placement optimization using an optimization method; and
    moving the data assets from one location to another location in the system using the scoring and simulation so as to minimize maximal load, wherein the data processing system is maintained by a large scale enterprise, and wherein the data assets comprise Big Data-scale data sets, and wherein the data assets comprise databases, stacks of databases, file systems, and enterprise services, and wherein the data assets are accessed through a Hadoop layer storing open source software components to control storing, processing, and analyzing the data, and wherein the data assets are stored in storage devices organized into arrays, and the arrays are located in one or more data centers of a federation business data lake (FBDL) storage system.

2. The method of claim 1 wherein the maximal load comprises a load risk representing how close a current load is to a service level agreement (SLA) requirement set by a system provider.

3. The method of claim 2 wherein the data retrieval system comprises a search engine processing the query from the target user, the search engine returning one or more data asset recommendations responsive to the query.

4. The method of claim 3 further comprising:
    monitoring and recording, by a monitoring component of the server, all interactions of a plurality of known users, including a first user and a target user, each interaction comprising an activity that triggers a read/write cycle to the storage;
    first deriving a similarity of each of the plurality of known users to the target user based on respective past and current data retrieval patterns of each of known users for data queried in the search engine;

modeling a plurality of possible users for whom there are no known interactions with the plurality of known users or the data assets to constitute missing features;
    training respective a generative model using different random seeds for an inference engine through reconstructive self-supervised learning (SSL) techniques to generate possible values for the missing features; and
    providing the generated possible values to a consensus mechanism to generate an integrated recommendation to the target user.

5. The method of claim 4 wherein the partial features comprise past searches, user interactions with the database, user interactions with each other, user profiles, product/service characteristics, user access patterns between users and the FBDL, user profiles and interactions among users.

6. The method of claim 5 wherein the optimization method comprises a genetic algorithm (GA).

7. The method of claim 1 wherein the moving step moves data assets from one disk to another disk within a storage device, or from one array to another array, or from one data center to another data center.

8. A method of processing queries input to a data retrieval system storing data assets for users in an enterprise, comprising:
    storing, in a federation business data lake (FBDL) storage maintained for a large-scale data processing system, data assets retrievable by a user in one or more possible locations along a scale of disks within a storage device, storage devices within arrays, and arrays within data centers;
    providing a search engine for entry of queries by a target user looking for data assets in the FBDL storage;
    generating search results and data asset recommendations in response to a target user query input to the search engine;
    providing the recommendations and past data asset access information for data assets as features to a time-series model for predicting future data access patterns by the target user;
    simulating an optimized placement of the data assets to maximal load using an optimization method; and
    moving the data assets from one location to another location in the system using the scoring and simulation.

9. The method of claim 8 wherein the maximal load comprises a load risk representing how close a current load is to a service level agreement (SLA) requirement set by a system provider.

10. The method of claim 9 further comprising determining and scoring an expected latency and load risk created by a weighted mean of these expected latency and load risk values.

11. The method of claim 9 wherein the data processing system is maintained by a large scale enterprise, and wherein the data assets comprise Big Data-scale data sets, and wherein the data assets comprise databases, stacks of databases, file systems, and enterprise services, and wherein the data assets are accessed through a Hadoop layer storing open source software components to control storing, processing, and analyzing the data.

12. The method of claim 11 wherein the moving step moves data assets from one disk to another disk within a storage device, or from one array to another array, or from one data center to another data center.

13. The method of claim 11 further comprising:
    monitoring and recording, by a monitoring component of the server, all interactions of a plurality of known users, including a first user and a target user, each interaction comprising an activity that triggers a read/write cycle to the storage;

first deriving a similarity of each of the plurality of known users to the target user based on respective past and current data retrieval patterns of each of known users for data queried in the search engine;

modeling a plurality of possible users for whom there are no known interactions with the plurality of known users or the data assets to constitute missing features;

training respective a generative model using different random seeds for an inference engine through reconstructive self-supervised learning (SSL) techniques to generate possible values for the missing features; and providing the generated possible values to a consensus mechanism to generate an integrated recommendation to the target user.

14. The method of claim 13 wherein the partial features comprise past searches, user interactions with the database, user interactions with each other, user profiles, product/service characteristics, user access patterns between users and the FBDL storage, user profiles and interactions among users.

15. A computer network system for optimizing placement of data assets in a data retrieval system storing data assets for users in an enterprise, comprising:

a search engine generating search results and data asset recommendations in response to a target user query;

a time-series modeling component receiving the recommendations and past data asset access information for data assets as features, and configured to predict future data access patterns by the target user; and a data asset placement engine receiving the future data asset access pattern prediction and determining and scoring an expected latency and load risk created by a weighted mean of these expected latency and load risk values, the data asset placement engine further simulating a placement optimization using an optimization method, and moving the data assets from one location to another location in the system using the scoring and simulation so as to minimize maximal load, wherein the data retrieval system is maintained by a large scale enterprise, and wherein the data assets comprise Big Data-scale data sets, and further wherein the data assets comprise databases, stacks of databases, file systems, and enterprise services, and wherein the data assets are accessed through a Hadoop layer storing open source software components to control storing, processing, and analyzing the data, and yet further wherein the data assets are stored in storage devices organized into arrays, and the arrays are located in one or more data centers of a federation business data lake (FBDL) storage system.

16. The computer network system of claim 15 wherein the maximal load comprises a load risk representing how close a current load is to a service level agreement (SLA) requirement set by a system provider, and wherein the moving step moves data assets from one disk to another disk within a storage device, or from one array to another array, or from one data center to another data center.

17. The computer network system of claim 16 wherein the data retrieval system comprises a search engine processing the query from the target user, the search engine returning one or more data asset recommendations responsive to the query.

* * * * *